Patented May 7, 1935

2,000,045

UNITED STATES PATENT OFFICE 2,000,045

ANTIOXIDANT

Arthur W. Sloan, Akron, Ohio, assignor to The B. F. Goodrich Company, New York, N. Y., a corporation of New York No Drawing. Application May 26, 1933, Serial No. 673,115

16 Claims. (Cl. 18—50)

This invention relates to the art of preserving rubber, fatty oils, petroleum products, synthetic plastics, and like organic materials against unduly rapid deterioration due to oxidation and the like.

This invention, in brief, consists in treating the rubber or other organic material with a member of a class of compounds which may be designated as aliphatic diamino substituted diaryl methane compounds. They have the general structural formula

where A and A' represent amino groups at least one and preferably both of which contain one or more aliphatic substituents, R and R' are aromatic nuclei, and X and Y are either hydrogen or hydrocarbon groups.

For example, the following compounds are typical members of the class of anti-oxidants described above: p-amino p'methylamino diphenylmethane; p,p' di(methylamino) diphenylmethane; p-amino p'dimethylamino diphenylmethane; p-methylamino p'dimethylamino diphenylmethane; tetramethyl p,p'diamino diphenylmethane; p,p' di(methylamino) dio-tolyl methane; di(methylamino) dinaphthyl methane; p,p' di(methylamino) diphenyl methyl methane; p,p' di(methylamino) diphenyl dimethyl methane; p,p' di(methylamino) triphenyl methane; p,p' di(methylamino) tetraphenyl methane; p,p' di(methylamino) di(biphenyl) methane; tetramethyl p,p' diamino triphenyl methane; tetramethyl p,p' diamino diphenyl dimethyl methane; tetramethyl diamino dinaphthyl methane; as well as the corresponding compounds substituted in the ortho, meta or other positions, and compounds in which the methyl groups are replaced by other aliphatic groups such as ethyl, propyl, butyl, amyl, hexyl, heptyl, etc., either straight or branched chain, and even groups such as cyclopentyl, cyclohexyl, benzyl and phenyl-ethyl groups, which, although not strictly aliphatic in nature, undergo the characteristic reactions of and confer upon their compounds essentially the same properties as purely aliphatic groups. Any of the above-enumerated compounds may be used with good effect to retard the deterioration of rubber or other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of tetramethyl p,p'diamino triphenyl methane. After vulcanization in a press for 45 minutes at 294° F. to produce an optimum cure, it is found that the composition containing the anti-oxidant deteriorates only approximately one-half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta percha, rubber isomers and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my co-pending application Serial No. 301,423 filed August 22, 1928.

I claim:

1. The method of preserving rubber which comprises treating rubber with a substance having the general formula

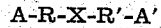

wherein A and A' represent amino groups, R and R' represent aromatic nuclei and X represents a methylene or hydrocarbon substituted methylene group, and at least one of the groups A and A' contains an aliphatic hydrocarbon substituent.

2. The method of preserving rubber which comprises treating rubber with a substance having the general formula $$A-R-X-R'-A'$$

wherein A and A' represent aliphatic hydrocarbon substituted amino groups, R and R' represent arylene groups, and X represents a methylene group.

3. The method of preserving rubber which comprises treating rubber with a substance having the general formula $$\begin{array}{c} H \\ A-R-C-R'-A' \\ Y \end{array}$$

wherein A and A' represent alkyl substituted amino groups, R and R' represent arylene groups, and Y represents a hydrocarbon substituent.

4. The method of preserving rubber which comprises treating rubber with a substance having the general formula $$A-R-CH_2-R'-A'$$

wherein A and A' represent alkyl substituted amino groups and R and R' represent aromatic nuclei.

5. The method of preserving rubber which comprises treating rubber with a substance having the general formula $$\begin{array}{c} H \\ A-R-C-R'-A' \\ Y \end{array}$$

wherein A and A' represent dialkyl amino groups, R and R' represent aromatic nuclei, and Y represents a hydrocarbon substituent.

6. The method of preserving rubber which comprises treating rubber with tetramethyl diamino diphenyl methane.

7. The method of preserving rubber which comprises treating rubber with tetramethyl diamino triphenyl methane.

8. A composition comprising rubber and a substance having the general formula $$A-R-X-R'-A'$$

wherein A and A' represent amino groups, R and R' represent aromatic nuclei and X represents a methylene or hydrocarbon substituted methylene group, and at least one of the groups A and A' contains an aliphatic hydrocarbon substituent.

9. A composition comprising rubber and a substance having the general formula $$A-R-X-R'-A'$$

wherein A and A' represent aliphatic hydrocarbon substituted amino groups, R and R' represent aryl groups, and X represents a methylene group.

10. A composition comprising rubber and a substance having the general formula $$\begin{array}{c} H \\ A-R-C-R'-A' \\ Y \end{array}$$

wherein A and A' represent alkyl substituted amino groups, R and R' represent arylene groups, and Y represents a hydrocarbon substituent.

11. A composition comprising rubber and a substance having the general formula $$A-R-X-R'-A'$$

wherein A and A' represent aliphatic hydrocarbon substituted amino groups, R and R' represent arylene groups, and X represents a methylene group.

12. A composition comprising rubber and a substance having the general formula $$\begin{array}{c} H \\ A-R-C-R'-A' \\ Y \end{array}$$

wherein A and A' represent alkyl substituted amino groups, R and R' represent phenylene groups, and Y represents a hydrocarbon substituent.

13. A composition comprising rubber and a substance having the general formula $$A-R-CH_2-R'-A'$$

wherein A and A' represent alkyl substituted amino groups and R and R' represent aromatic nuclei.

14. A composition comprising rubber and a substance having the general formula $$\begin{array}{c} H \\ A-R-C-R'-A' \\ Y \end{array}$$

wherein A and A' represent dialkyl amino groups, R and R' represent aromatic nuclei, and Y represents a hydrocarbon substituent.

15. The method of preserving rubber which comprises vulcanizing a mixture containing rubber, sulphur, an active organic accelerator of vulcanization, and a substance having the general formula $$A-R-X-R'-A'$$

wherein A and A' represent amino groups, R and R' represent aryl groups and X represents a methylene group or hydrocarbon substituted methylene group, and at least one of the groups A and A' contains an aliphatic hydrocarbon substituent.

16. The method of preserving rubber which comprises vulcanizing a mixture containing rubber, sulphur, an active organic accelerator of vulcanization, and a substance having the general formula $$A-R-X-R'-A'$$

wherein A and A' represent alkyl substituted amino groups, R and R' represent arylene groups, and X represents a methylene group.

ARTHUR W. SLOAN.